(12) United States Patent
Miyashita et al.

(10) Patent No.: US 11,389,876 B2
(45) Date of Patent: Jul. 19, 2022

(54) METHOD OF CORRECTING A LASER RADIATION POSITION

(71) Applicant: Sodick Co., Ltd., Kanagawa (JP)

(72) Inventors: Yasuyuki Miyashita, Kanagawa (JP); Shuji Okazaki, Kanagawa (JP); Ichiro Araie, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 849 days.

(21) Appl. No.: 16/254,620

(22) Filed: Jan. 23, 2019

(65) Prior Publication Data

US 2019/0151947 A1    May 23, 2019

Related U.S. Application Data

(63) Continuation of application No. 15/694,868, filed on Sep. 4, 2017, now abandoned.

(30) Foreign Application Priority Data

Nov. 22, 2016    (JP) ............................. JP2016-227153

(51) Int. Cl.
*G06F 19/00* (2018.01)
*B22F 10/00* (2021.01)
(Continued)

(52) U.S. Cl.
CPC .............. *B22F 10/00* (2021.01); *B22F 10/30* (2021.01); *B22F 12/00* (2021.01); *B22F 10/10* (2021.01);
(Continued)

(58) Field of Classification Search
CPC ........ B23K 26/04; G02B 26/10; B33Y 30/00; B33Y 50/02; B22F 2203/03; B22F 2999/00; B22F 10/00; B22F 12/00
See application file for complete search history.

(56) References Cited

U.S. PATENT DOCUMENTS 5,832,415 A * 11/1998 Wilkening ............. G02B 26/10
702/86
6,459,063 B1   10/2002 Okazaki et al.
(Continued)

FOREIGN PATENT DOCUMENTS

CN        1302242        7/2001
CN        1480304        3/2004
(Continued)

*Primary Examiner* — Tuan A Vu
(74) *Attorney, Agent, or Firm* — JCIPRNET (57) ABSTRACT

A laminating and shaping apparatus includes a laser radiation unit configured to radiate a laser to a powder layer and form sintered sections, an imaging unit configured to image the sintered sections, a calculation device configured to calculate actual laser radiation positions from positions of the sintered sections and calculate a positional deviation of the laser radiation position at each of the sintered sections, and a correction device configured to correct the actual laser radiation position of each of the sintered sections to a target laser radiation position. The laser radiation unit forms sintered sections to surround the irradiation region by performing laser radiation on places including outermost positions in the irradiation region, and as the recoater head is moved in the horizontal uniaxial direction after imaging of the plurality of sintered sections by the imaging unit, at least a plurality of sintered sections are removed from the irradiation region.

5 Claims, 10 Drawing Sheets

(51) Int. Cl.
  *B22F 12/00* (2021.01)
  *B22F 10/30* (2021.01)
  *B22F 10/10* (2021.01)
  *B22F 10/20* (2021.01)
  *B33Y 30/00* (2015.01)
  *B33Y 50/02* (2015.01)

(52) U.S. Cl.
  CPC ........... *B22F 10/20* (2021.01); *B22F 2203/03* (2013.01); *B22F 2999/00* (2013.01); *B33Y 30/00* (2014.12); *B33Y 50/02* (2014.12); *Y02P 10/25* (2015.11)

(56) References Cited

U.S. PATENT DOCUMENTS

| | | | |
|---|---|---|---|
| 8,647,511 | B2 | 2/2014 | Dohi et al. |
| 8,884,186 | B2 | 11/2014 | Uckelmann et al. |
| 2010/0176539 | A1 | 7/2010 | Higashi et al. |
| 2017/0239721 | A1* | 8/2017 | Buller ................... B23K 26/04 |

FOREIGN PATENT DOCUMENTS

| | | |
|---|---|---|
| CN | 1921970 | 2/2007 |
| CN | 102196878 | 9/2011 |
| JP | 4258567 | 4/2009 |
| RU | 2450891 | 5/2012 |

\* cited by examiner

METHOD OF CORRECTING A LASER RADIATION POSITION

CROSS-REFERENCE TO RELATED APPLICATION

This is a continuation application of patent application Ser. No. 15/694,868, filed on Sep. 4, 2017, which claims the priority benefit of Japan application serial no. 2016-227153, filed on Nov. 22, 2016. The entirety of the above-mentioned patent application is hereby incorporated by reference herein and made a part of this specification.

BACKGROUND OF THE INVENTION

Field of the Invention

The invention relates to a laminating and shaping apparatus for manufacturing a laminated and shaped article formed of metal.

Description of Related Art

As an apparatus for manufacturing a laminated and shaped article formed of metal, a laminating and shaping apparatus disclosed in Patent Document 1 has been provided. In the laminating and shaping apparatus, a recoater head is moved immediately above a shaping table in a shaping bath in a horizontal uniaxial direction, a metal powder material is supplied by a material storage box and a blade installed on the recoater head, a powder layer is formed by flattening, and a laser is radiated to an irradiation region of a powder layer by a laser radiation unit to form a sintered layer. Then, a metal laminated and shaped article is manufactured by repeating forming a new powder layer on the sintered layer, performing laser radiation and forming a sintered layer. Further, in order to improve processing accuracy, cutting processing is performed on a surface of the sintered layer or unnecessary portions during shaping using a rotary cutting tool installed on a cutting apparatus that is movable in horizontal and vertical directions.

In the laminating and shaping apparatus for performing such laminating and shaping, a plurality of heat sources are present. For this reason, thermal displacement may occur in a member that constitutes the laminating and shaping apparatus due to heat transmitted from the heat sources.

In particular, the laser radiation unit performs laser radiation toward a powder layer from a place away from the powder layer. Accordingly, an influence due to thermal displacement occurring in the laser radiation unit can be easily caused at a laser radiation position, and a positional deviation may be large even when the thermal displacement is small. When laminating and shaping is performed in a state in which such a positional deviation occurs, processing accuracy of the completed laminated and shaped article is significantly decreased. Accordingly, before shaping of a new laminated and shaped article, it is desirable to correct a deviation having occurred at the laser radiation position during the previous laminating and shaping.

Here, in the laminating and shaping apparatus disclosed in Patent Document 2, laser radiation is performed at a plurality of places on an irradiation target, which are previously determined, as a function of position coordinates, and a test pattern is generated. Then, parts of an irradiation target are imaged with a camera to create digitalized partial images of the test pattern, and these are assembled to obtain the entire image. Then, the deviation of the laser radiation position is corrected by comparing a position previously determined as a function of position coordinates and a position actually irradiated with the laser projected to the entire image, and calculating differential data.

PRIOR ART DOCUMENTS

Patent Documents

[Patent Document 1] Japanese Patent No. 5888826
[Patent Document 2] Japanese Patent No. 2979431

SUMMARY OF THE INVENTION

Here, as an irradiation target used to generate a test pattern, a heat sensitive film such as a heat sensitive paper or the like attached to a flat metal plate or a glass plate is known, but thermal deformation of such a heat sensitive film may occur throughout the entire film due to heat during laser radiation. Further, since a plurality of irradiation marks are formed throughout one heat sensitive film, places where the plurality of irradiation marks are irradiated with a laser during formation are physically connected to each other. For this reason, thermal deformation occurring in the heat sensitive film when a laser is radiated to a certain place and the irradiation marks are formed may change positions in the irradiation marks formed at places distant from this place. That is, positions of all of the irradiation marks which are previously formed may change whenever laser radiation is performed. Accordingly, a deviation may occur between the laser radiation position immediately after laser radiation and the laser radiation position when calculated by a predetermined calculation device after forming all of the irradiation marks. Accordingly, in the laminating and shaping apparatus disclosed in Patent Document 2, since correction is performed by calculating a difference between a position different from an actual laser radiation position and the laser radiation position serving as a target when the laser radiation position is corrected, the correction accuracy thereof is low.

In particular, in the correction of the laser radiation position performed before the laminating and shaping, since many irradiation marks are formed on the heat sensitive film to correct the laser radiation position, an influence thereon is more significant.

In consideration of the above-mentioned circumstances, an object of the present invention is to provide a laminating and shaping apparatus capable of more accurately correcting a deviation of a laser radiation position occurring during the previous laminating and shaping before shaping of a new laminated and shaped article.

A laminating and shaping apparatus according to a first aspect of the present invention includes a shaping bath filled with an inert gas having a predetermined concentration; a shaping section movable in the shaping bath in an upward/downward direction; a recoater head reciprocally moving in a horizontal uniaxial direction and configured to flatten a metal powder material on the shaping section while supplying the metal powder material to form a powder layer; a laser radiation unit configured to radiate a laser to a predetermined irradiation region of the powder layer and form a plurality of sintered sections; an imaging unit configured to image the plurality of sintered sections formed on the powder layer respectively; a calculation device configured to calculate actual laser radiation positions from positions of the plurality of sintered sections imaged by the imaging unit respectively, and calculate a positional deviation of the laser radiation position by comparing the actual laser irradiation position with a target laser radiation position in the case where a deviation of the laser radiation position is zero in each of the sintered sections; and a correction device configured to correct the actual laser radiation position of each of the sintered sections to a target laser radiation position based on the positional deviation of the laser radiation position calculated by the calculation device, wherein the laser radiation unit forms a plurality of sintered sections to surround the irradiation region by performing laser radiation on a plurality of places including outermost positions in the irradiation region, and when the recoater head is moved in the horizontal uniaxial direction after imaging of the plurality of sintered sections by the imaging unit, at least a plurality of sintered sections are removed from the irradiation region.

In the present invention, the laser radiation unit configured to radiate a laser to the predetermined irradiation region of the powder layer and form the plurality of sintered sections, the imaging unit configured to image the plurality of sintered sections formed on the powder layer respectively, the calculation device configured to calculate the actual laser radiation positions from the positions of the plurality of sintered sections imaged by the imaging unit respectively, and calculate a positional deviation of the laser radiation position by comparing the actual laser irradiation position with a target laser radiation position in the case where a deviation of the laser radiation position is zero in each of the sintered sections, and the correction device configured to correct the actual laser radiation position of each of the sintered sections to the target laser radiation position based on the positional deviation of the laser radiation position calculated by the calculation device are provided. Accordingly, the plurality of sintered sections are formed by radiating a laser to the powder material without using an irradiation target, and correction is performed by calculating a deviation between the actual laser radiation position and the target laser radiation position in each of the sintered sections imaged by the imaging unit. Since thermal deformation occurring when the powder material is irradiated with the laser spreads radially by the laser radiation position served as a center, the center position of the sintered section serving as the actual laser radiation position is not changed by thermal deformation. Accordingly, when the actual laser radiation position is calculated as the center position of the sintered section, a deviation does not occur between the actual laser radiation position and the laser radiation position after thermal deformation. In addition, since the radiation target of the laser is the powder material, the powder materials that form the sintered sections are separated without being physically connected to each other. For this reason, heat generated when the sintered sections are formed by radiating the laser to the powder material of a certain place does not exert an influence on the positions of other sintered sections formed at places distant from this place. That is, like the laminating and shaping apparatus disclosed in Patent Document 2, the positions of all of the previously formed irradiation marks do not change at every laser radiation. Accordingly, according to the present invention, the actual laser radiation position is not changed by heat generated when the sintered sections are formed, and also not changed by heat generated when the sintered sections formed thereafter are formed. Accordingly, a deviation between the actual laser radiation position and the laser radiation position calculated by the calculation device after forming all of the irradiation marks can be prevented. Accordingly, in comparison with the case in which the irradiation target is used like Patent Document 2, correction of the laser radiation position can be more accurately performed.

In addition, as described above, the irradiation target is created as a worker attaches the heat sensitive film to a metal flat plate or a glass plate whenever the laminated and shaped article is shaped. Further, a worker needs to do work of opening the shaping bath, cleaning, attaching and removing the shaping table to which the irradiation target is attached, and so on, before and after correcting the deviation of the laser radiation position. Accordingly, when the irradiation target is used, a work burden of a worker is increased. In addition, the metal flat plate or the glass plate and the heat sensitive film that constitute the irradiation target are disposable. Accordingly, since a new irradiation target is consumed whenever a laminated and shaped article is shaped, manufacturing costs are increased.

In the present invention, since the deviation of the laser radiation position can be corrected without using the irradiation target, a work burden of a worker can be reduced. In addition, manufacturing costs can be reduced.

In addition, in the present invention, the laser radiation unit forms the plurality of sintered sections to surround the irradiation region by performing laser radiation toward a plurality of places including the outermost positions in the irradiation region. Accordingly, the deviation of the laser radiation position can be corrected throughout the irradiation region.

In addition, in the present invention, as the recoater head is moved in the horizontal uniaxial direction after imaging of the plurality of sintered sections by the imaging unit, at least the plurality of sintered sections are removed from the irradiation region. Accordingly, the sintered body that is sintered a plurality of times can be prevented from being included in the sintered layer, and the obtained laminated and shaped article can be homogenized.

According to the laminating and shaping apparatus of the second aspect of the present invention, in the first aspect, the imaging unit is installed on the recoater head.

In the present invention, the imaging unit is installed on the recoater head. Accordingly, as the recoater head is moved on the powder layer in the horizontal uniaxial direction, the plurality of sintered sections formed on the powder layer can be imaged respectively without increasing the number of components of the laminating and shaping apparatus.

According to the laminating and shaping apparatus of a third aspect of the present invention, in the first aspect, a main shaft that is movable above the shaping section in the shaping bath is further provided, and the imaging unit is installed on the main shaft.

In the present invention, the main shaft movable above the shaping section in the shaping bath is further provided, and the imaging unit is installed on the main shaft. Accordingly, as the main shaft freely moves on the powder layer, the plurality of sintered sections formed on the powder layer can be efficiently imaged within a shorter time.

According to the laminating and shaping apparatus of a fourth aspect of the present invention, in the first aspect, the plurality of sintered sections formed on the powder layer by the laser radiation unit have a maximum width of 0.1 mm to 5.0 mm.

Here, noise having a maximum width of about 50 µm is included in data imaged by the imaging unit. Accordingly, when a size of the sintered section is small, it is difficult to distinguish between the actual sintered section and the noise included in the data imaged by the imaging unit.

In the present invention, the plurality of sintered sections formed on the powder layer by the laser radiation unit have a maximum width or 0.1 mm to 5.0 mm. Accordingly, confusion between the actual sintered section and the noise included in the data imaged by the imaging unit can be prevented.

According to the laminating and shaping apparatus of a fifth aspect of the present invention, in the first aspect, a laminated and shaped article obtained by the laminating and shaping apparatus is shaped by repeating forming a powder layer having a predetermined thickness on the shaping section using the recoater head, sintering the powder layer using the laser radiation unit, and forming the sintered layer, a thickness of a powder layer formed next to the predetermined sintered layer is set such that sintering does not reach the powder layer having a predetermined thickness formed next to the sintered layer even when the thickness is larger than the predetermined thickness and a plurality of sintered sections are formed by laser radiation, the laser radiation unit forms a plurality of sintered section by irradiating the irradiation region with a laser, the imaging unit images the plurality of sintered sections respectively, the calculation device calculates actual laser radiation positions from positions of the plurality of sintered sections imaged by the imaging unit respectively, and calculate a positional deviation of the laser radiation position by comparing the actual laser irradiation position with a target laser radiation position in a case where a deviation of laser radiation position is zero in each of the sintered sections, the correction device corrects the actual laser radiation position of each of the sintered sections to the target laser radiation position based on the positional deviation of the laser radiation position calculated by the calculation device, and as the recoater head is moved in the horizontal uniaxial direction after imaging of the plurality of sintered sections by the imaging unit, portions of the plurality of sintered sections and powder materials are removed from the irradiation region such that the powder layer has the predetermined thickness.

In the present invention, during the laminating and shaping, a powder layer having a thickness larger than a predetermined thickness of a powder layer serving as a sintered layer that forms the laminated and shaped article is formed such that sintering does not reach the powder layer formed next to this sintered layer even when a plurality of sintered sections are formed next to the predetermined sintered layer by laser radiation. Then, a laser is radiated to the powder layer to form the plurality of sintered sections, and a positional deviation between the actual laser radiation position and the target laser radiation position is calculated at each of the sintered sections imaged by the imaging unit to perform correction. Further, as the recoater head is moved in the horizontal uniaxial direction after imaging of the plurality of sintered sections by the imaging unit, portions of the plurality of sintered sections and powder materials are removed from the irradiation region such that the powder layer has a predetermined thickness. Accordingly, since the deviation of the laser radiation position due to thermal displacement of the laser radiation unit occurring during the shaping of the laminated and shaped article can be corrected, a laminated and shaped article having higher processing accuracy can be obtained.

According to the present invention, before shaping of a new laminated and shaped article, the deviation of the laser radiation position occurring during the previous laminating and shaping can be more accurately corrected.

DESCRIPTION OF THE EMBODIMENTS

Here, an embodiment of the present invention will be described with reference to the accompanying drawings.

Figure 1:
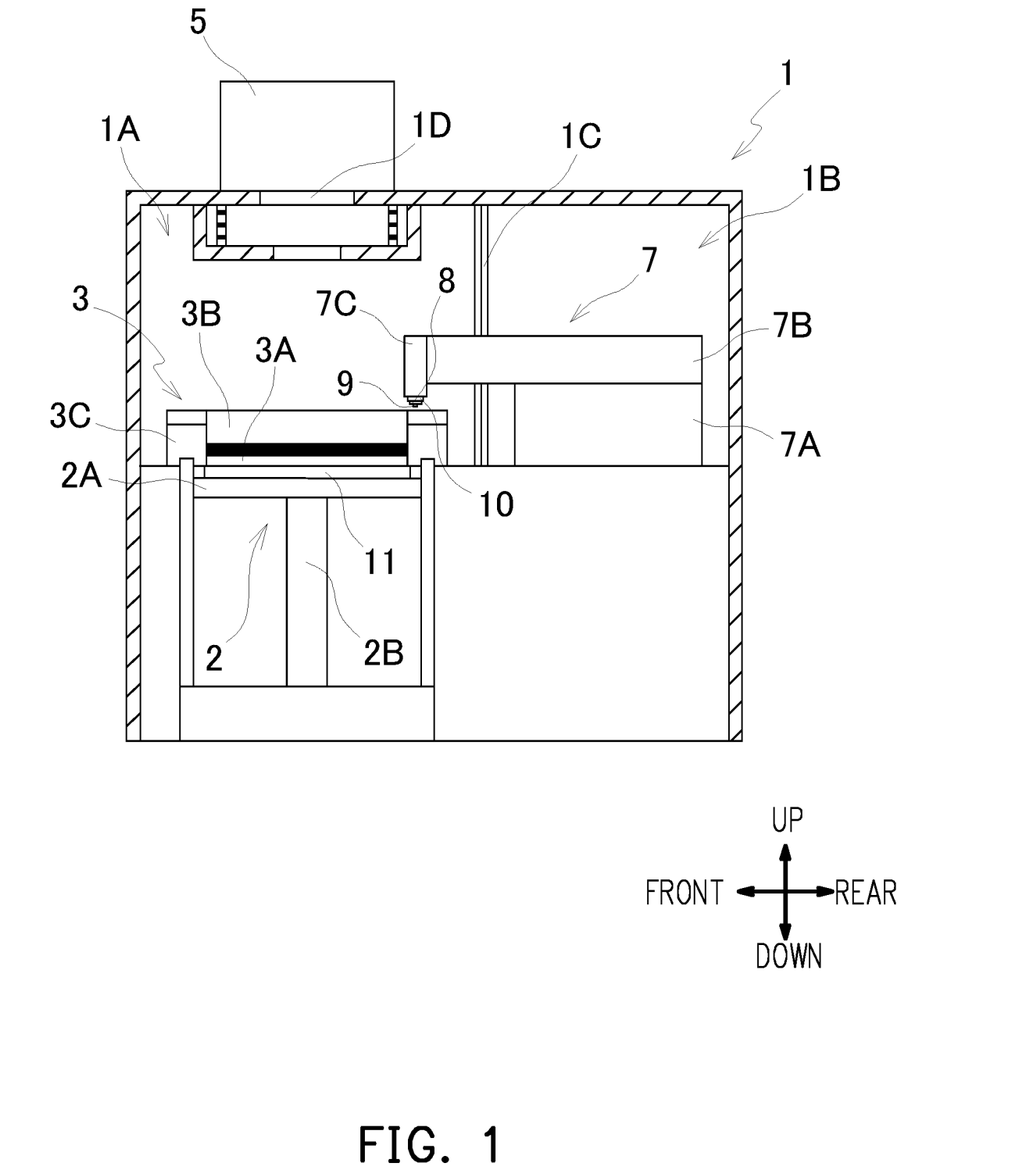
FIG. 1 is schematic side view showing the entire configuration of a laminating and shaping apparatus according to the embodiment.

A laminating and shaping apparatus 1 is a sintered metal powder laminating and shaping apparatus. As shown in FIG. 1, the laminating and shaping apparatus 1 has a shaping chamber 1A and a drive apparatus chamber 1B, which are installed in a shaping bath. The shaping chamber 1A is disposed in a front portion of the laminating and shaping apparatus 1. The drive apparatus chamber 1B is disposed in a rear portion of the laminating and shaping apparatus 1. The shaping chamber 1A and the drive apparatus chamber 1B are partitioned by a bellows 1C. An inert gas is supplied into the shaping chamber 1A and the drive apparatus chamber 1B from an inert gas supply apparatus (not shown). Accordingly, the shaping chamber 1A and the drive apparatus chamber 1B are configured such that an oxygen concentration in the shaping bath is decreased as much as possible. Further, in the following description, in the drawing of FIG. 1, a left side is defined as the front, a right side is defined as the rear, a front side is defined as the right, a back side is defined as the left, an upper side is defined as the top, and a lower side is defined as the bottom, and directions of "front," "rear," "right," "left," "up" and "down" are explained using these directional words.

A shaping space configured to form a laminated and shaped article is formed in the shaping chamber 1A. A metal powder material is spread in the shaping space. A shaping table 2A is accommodated in the shaping chamber 1A. The shaping space is formed in the entire region above the shaping table 2A. A shaping plate 11 is disposed on the shaping table 2A.

Figure 2:
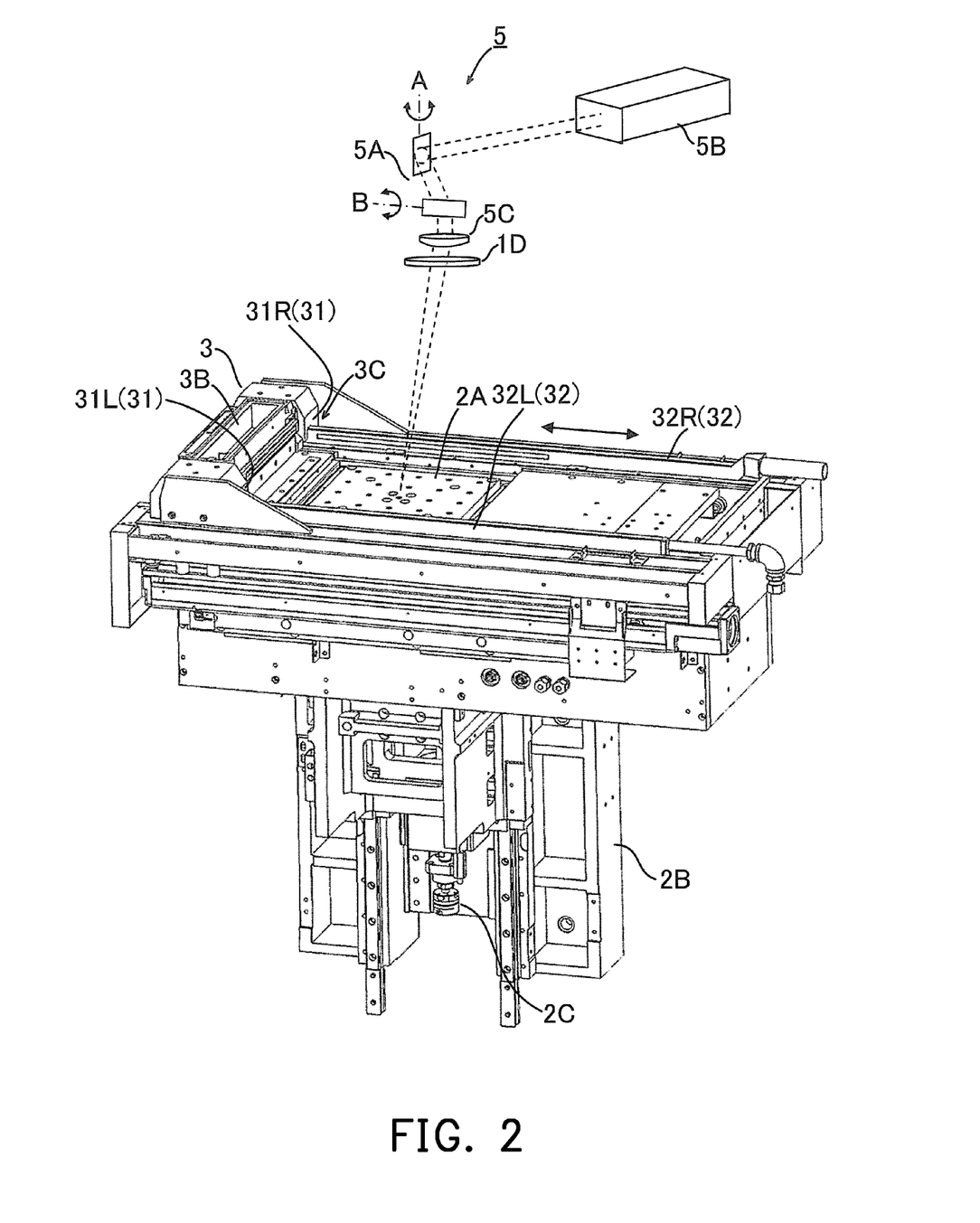
FIG. 2 is a perspective view showing a lower structure of the laminating and shaping apparatus.

As shown in FIGS. 1 and 2, a powder layer forming apparatus 2 has the shaping table 2A, a support mechanism 2B configured to elevate the shaping table 2A while supporting the shaping table 2A, a transmission mechanism 2C configured to transmit movement to the support mechanism 2B, a drive apparatus including a motor (not shown) configured to drive the support mechanism 2B, and so on.

Figure 3:
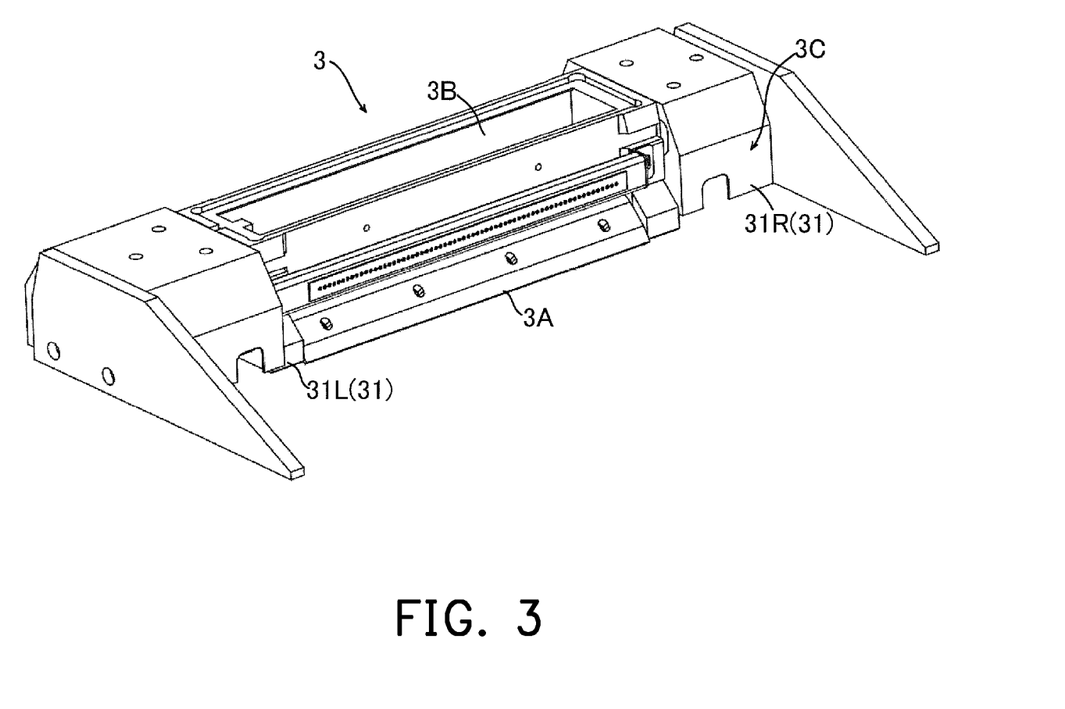
FIG. 3 is a perspective view showing a recoater head of the laminating and shaping apparatus.

As shown in FIG. 3, a recoater head 3 has a blade 3A, a material storage box 3B, a guide mechanism 3C, and so on. The recoater head 3 forms a new powder layer by supplying a powder material from the material storage box 3B, horizontally moving the blade 3A along a reference height h0 in a leftward/rightward direction and flattening the supplied powder material.

A material supply apparatus (not shown) configured to supply a powder material into the material storage box 3B is installed above the blade 3A. The material storage box 3B is replenished with the powder material from the material supply apparatus in a timely manner such that the amount of the powder material in the material storage box 3B does not become insufficient during shaping of a laminated and shaped article.

As shown in FIG. 2, the guide mechanism 3C has a pair of bearings 31, and guide rails 32R and 32L serving as a pair of shaft members 32 received by the bearings 31R and 31L respectively. The recoater head 3 reciprocally moves in the leftward/rightward direction by being guided by the guide mechanism 3C.

A laser radiation unit 5 forms a sintered layer by irradiating the powder layer with a laser. The laser radiation unit 5 has a laser scanning apparatus 5A including two galvanometer mirrors, a laser oscillator 5B, a focal lens 5C, a control apparatus (not shown) configured to control them, and so on.

A laser having a predetermined energy output from the laser oscillator 5B reaches the galvanometer mirrors of the laser scanning apparatus 5A through a laser transmission member. A laser reflected by the pair of galvanometer mirrors is converged by the focal lens 5C and passes through a transmission lens 1D installed in a through-hole punched in a top board of the shaping chamber 1A. The laser converged by the focal lens 5C is radiated to the powder layer at a spot diameter that is previously determined.

As shown in FIG. 1, a cutting apparatus 7 has a first moving body 7A that is reciprocally movable in the leftward/rightward direction, a second moving body 7B that is reciprocally movable in the forward/rearward direction, a processing head 7C that is reciprocally movable in the upward/downward direction, a control apparatus (not shown) configured to control them, and so on. In addition, an imaging unit 10 and a spindle head 8 are installed in the processing head 7C. The imaging unit 10 is, for example, a CCD camera having a visible light region as a dynamic range. As described below, the imaging unit 10 is used when a deviation of a laser radiation position generated during the previous laminating and shaping is corrected before shaping of a new laminated and shaped article. The spindle head 8 is configured to be rotatable in a state in which a cutting tool 9 is mounted. The spindle head 8 is installed at a left side of the imaging unit 10.

The cutting apparatus 7 can determine a position in the leftward/rightward direction using the first moving body 7A, a position in the forward/rearward direction using the second moving body 7B, and a position in the upward/downward direction using the processing head 7C. Accordingly, the cutting tool 9 can be freely moved in 3 axial directions and positioned at an arbitrary height in the shaping chamber 1A. Then, cutting is performed by applying a cutting edge 9A of the cutting tool 9 rotating at a high speed while moving in a horizontal direction.

Next, a process of manufacturing a laminated and shaped article using the laminating and shaping apparatus 1 will be described simply.

As the recoater head 3 is horizontally moved in the leftward/rightward direction, a powder material on the shaping plate 11 is flattened by the blade 3A while supplying a powder material into the shaping space on the shaping table 2A from the material storage box 3B. Accordingly, a powder layer having a predetermined thickness is formed on the shaping plate 11 and an irradiation region R is irradiated with a laser to form a sintered layer. After forming the sintered layer, the shaping table 2A is lowered to an extent of a thickness of a powder layer that is formed next. Then, a new powder layer having a thickness equal to a descending distance of the shaping table 2A is formed on the sintered layer, and a sintered layer is formed by irradiating the irradiation region R with a laser. When such work is repeated, a desired laminated and shaped article is manufactured. In addition, in order to increase surface accuracy or the like, whenever a plurality of sintered layers are formed, a cutting process of performing cutting processing on a surface of the sintered layer or unnecessary parts using the cutting tool 9 mounted on the spindle head 8 is performed with respect to the sintered layers.

Figure 4:
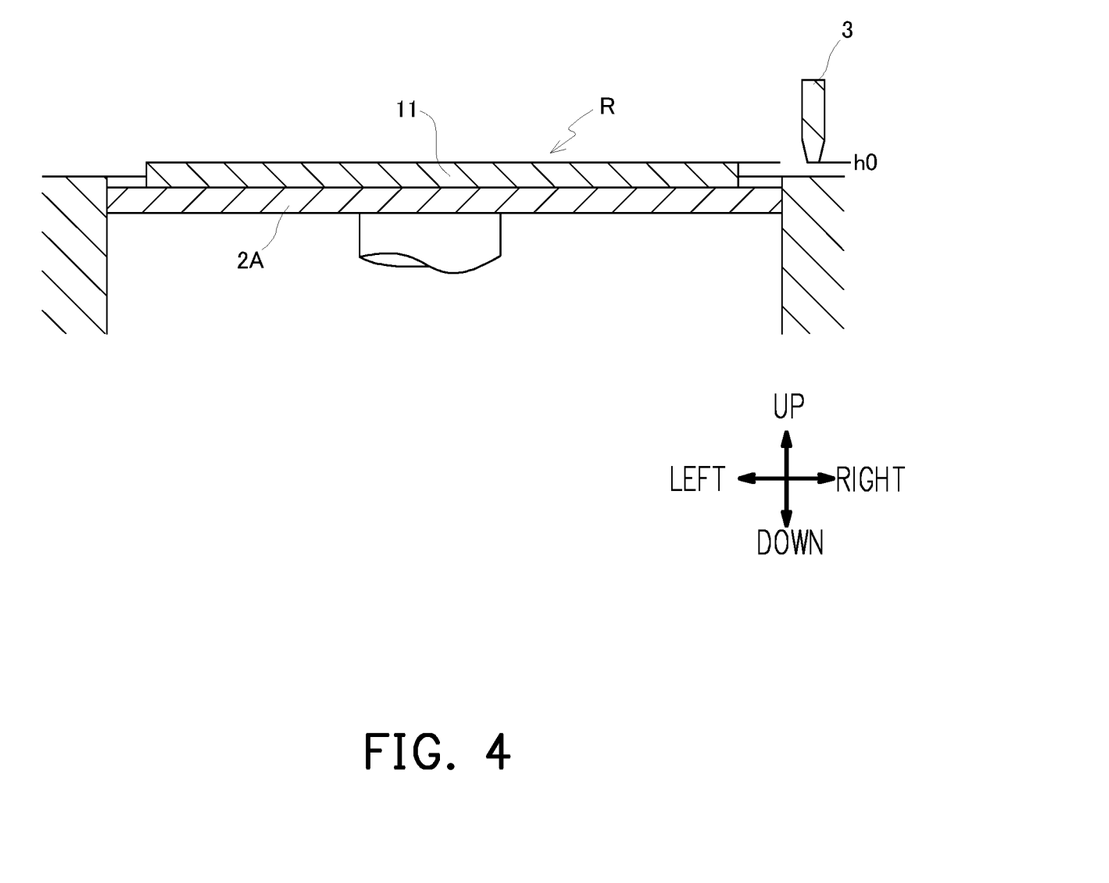
FIG. 4 is a front view of a shaping space before forming a powder layer.

Further, in the embodiment, as a deviation of a laser radiation position occurring during the previous laminating and shaping is corrected before shaping of a new laminated and shaped article, laser radiation is accurately performed at a desired position in the irradiation region R. Hereinafter, an operation of the laminating and shaping apparatus 1 when the laser radiation position is corrected before laminating and shaping will be described in detail with reference to FIGS. 4 to 10. Further, as shown in FIG. 4, before starting the shaping of the laminated and shaped article, a height of an upper surface of the shaping plate 11 is set to the reference height h0 equal to a height of a lower end of the recoater head 3 configured to spread a powder material. As described above, the recoater head 3 spreads a powder material while moving along the reference height h0 in a horizontal uniaxial direction.

Figure 5:
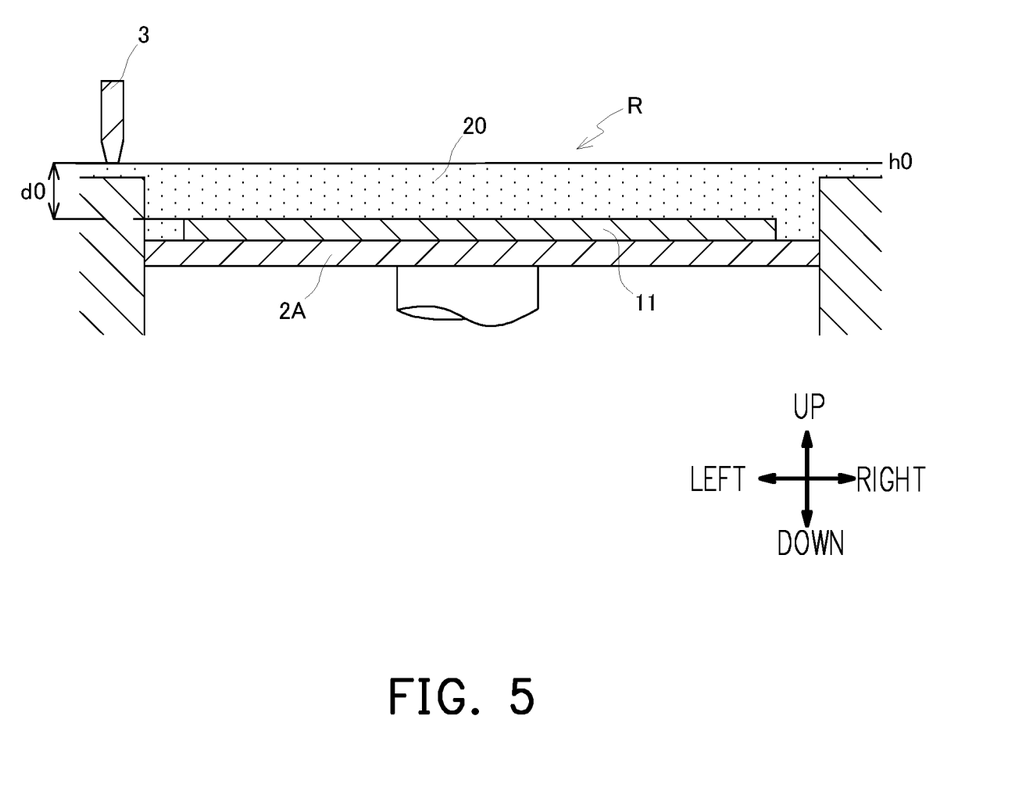
FIG. 5 is a front view of a shaping space after forming a powder layer.

First, as shown in FIG. 5, the shaping table 2A is lowered to a height at which the sintered section 20A does not reach the shaping plate 11 even when laser radiation is performed on a powder layer 20 formed on the shaping plate 11 to form a sintered section 20A at the height of the upper surface of the shaping plate 11. Then, as the recoater head 3 is moved along the reference height h0 in the horizontal uniaxial direction, the powder layer 20 having a thickness d0 equal to a difference between the reference height h0 and a height h1 of the upper surface of the shaping plate 11 is formed on the irradiation region R.

Figure 6:
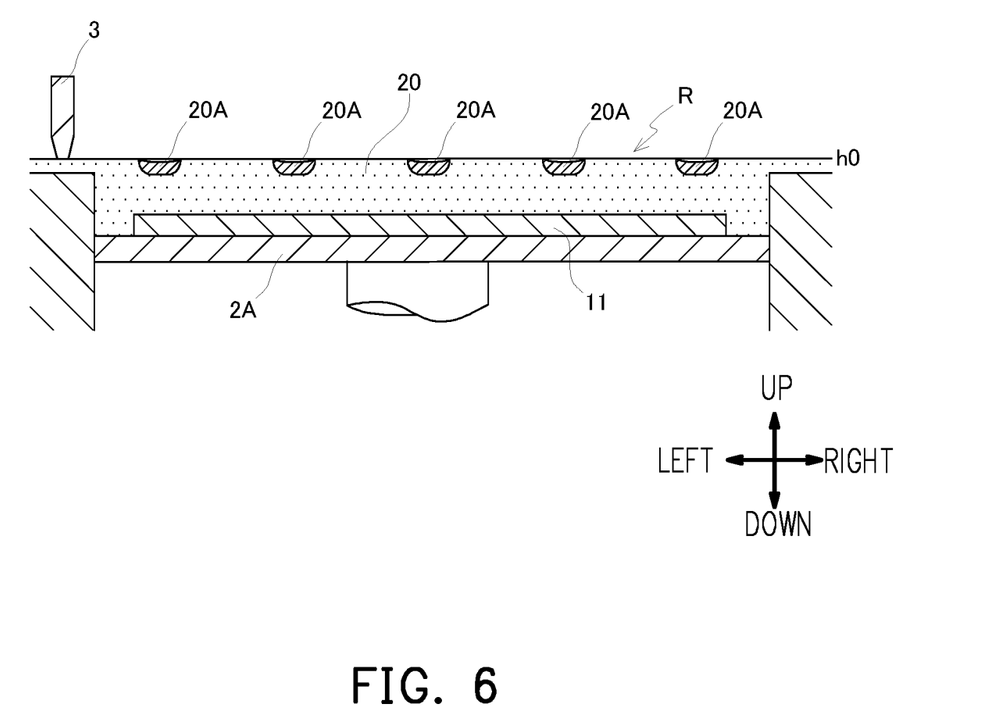
FIG. 6 is a front view of a shaping space after forming a sintered section.

Next, laser radiation conditions are set. The laser radiation conditions are, for example, an intensity of a laser, a spot diameter, a radiation target position, and so on. As shown in FIG. 6, as a laser is radiated toward a radiation target position on the powder layer 20, the sintered section 20A is formed on the upper layer section of the powder layer 20. More specifically, a rotation control signal corresponding to a radiation target position is input to the galvanometer mirrors by the control apparatus (not shown) configured to control the laser radiation unit 5, and the galvanometer mirrors are directed to predetermined angles respectively. Then, a laser is output from a laser beam source and radiated to a predetermined position (hereinafter, referred to as an actual radiation position) corresponding to the target laser radiation position via the galvanometer mirrors. Accordingly, an upper layer section of the powder layer 20 is sintered to form the sintered sections 20A.

Figure 7:
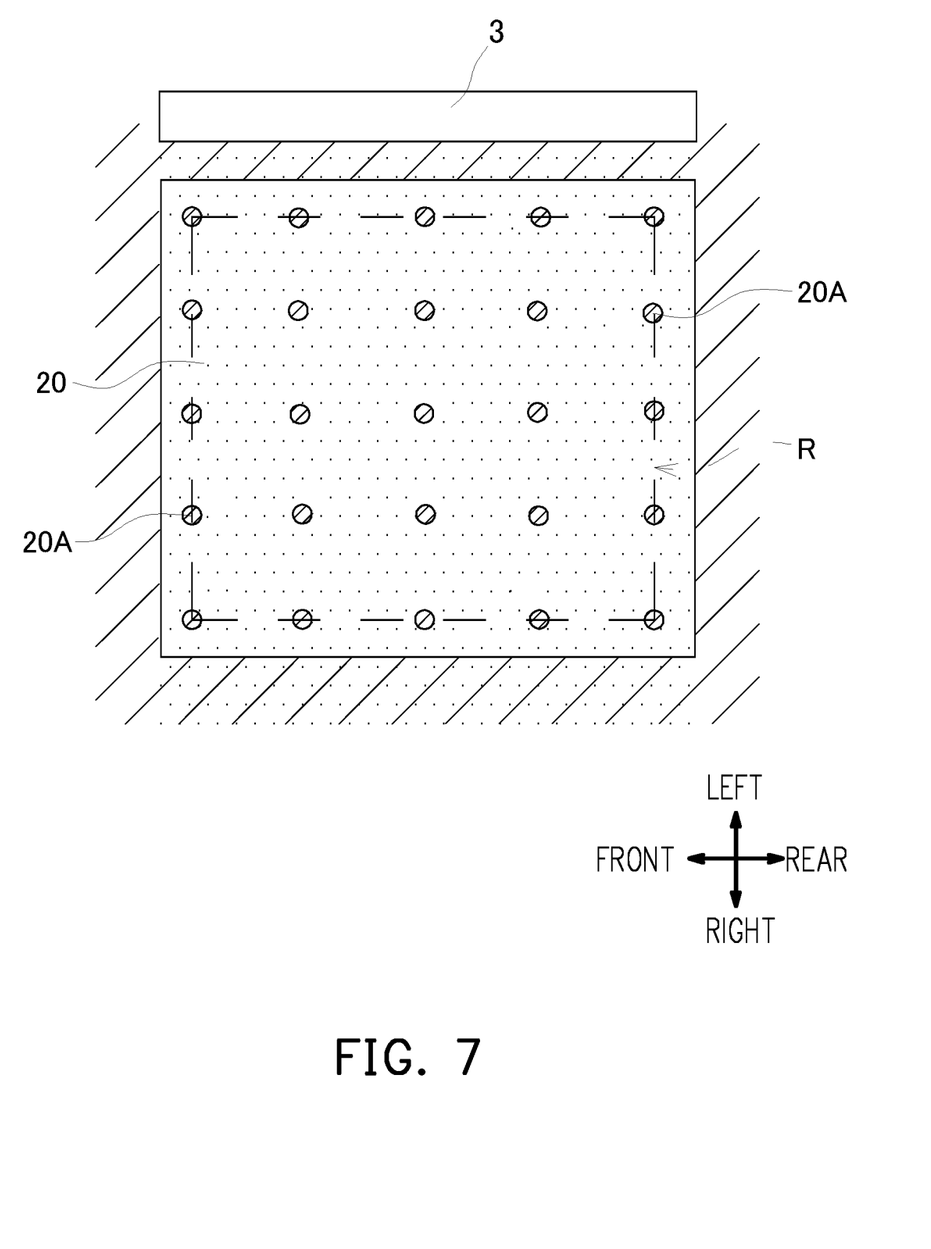
FIG. 7 is a plan view of a shaping space after forming a sintered section.

As shown in FIG. 7, the sintered sections 20A are disposed in the entire region of the irradiation region R at predetermined intervals in a lattice pattern. Here, the sintered sections 20A formed at outermost positions in the irradiation region R are formed to surround the irradiation region R to be corrected such that centers of gravity position of these positions are disposed at outermost positions in the irradiation region R. In the embodiment, the plurality of (a total of 25) sintered sections 20A are formed.

Figure 8:
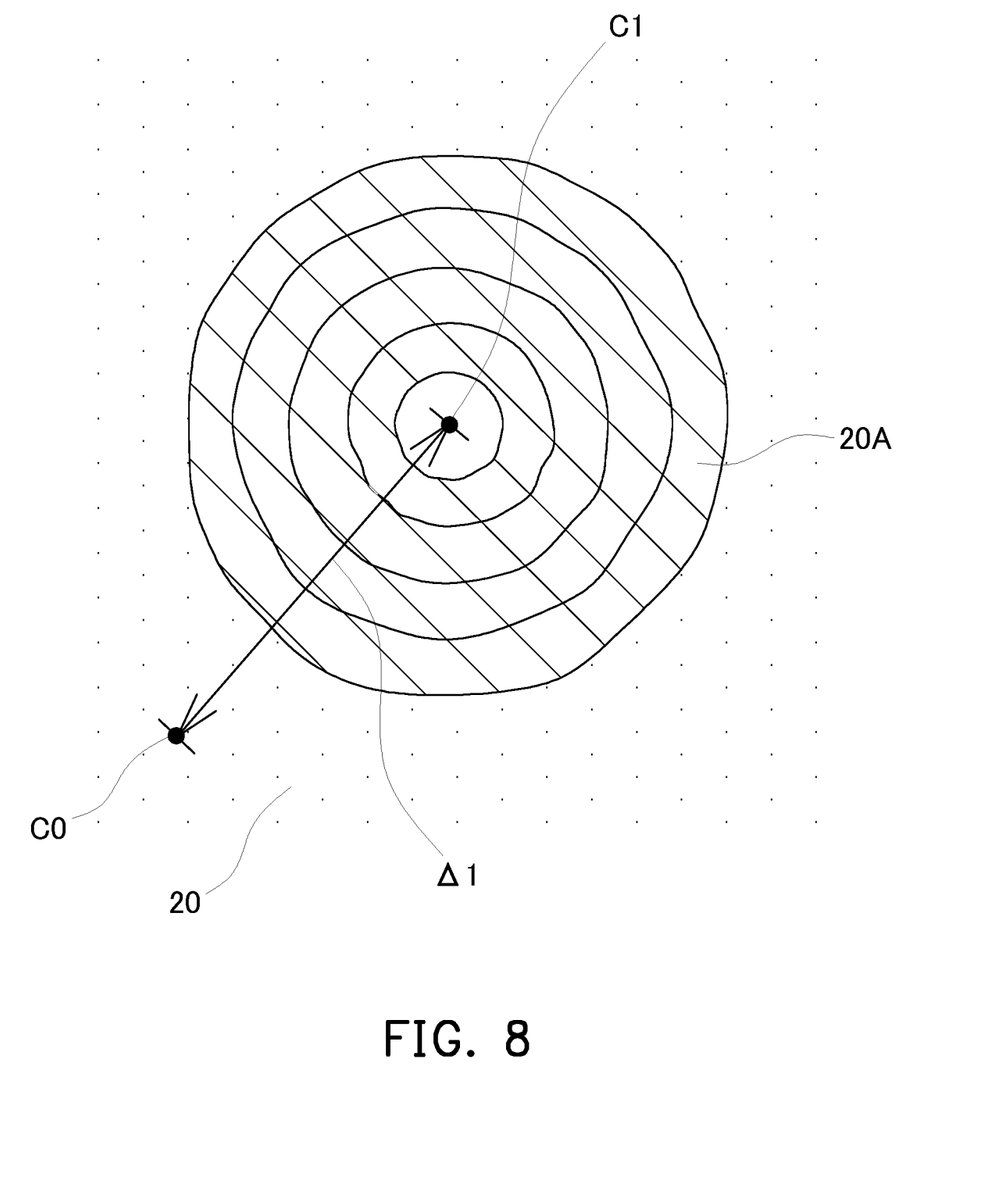
FIG. 8 is an enlarged view of the sintered section shown in FIG. 7.

As shown in FIG. 8, a shape of the sintered section 20A is a ring shape having a predetermined width in the radial direction. A size of the sintered section 20A is set such that a maximum width is within a range of 0.1 mm to 5.0 mm. The sintered sections 20A are formed by repeating laser radiation such that a plurality of rings having different diameters are drawn in sequence from the outside or the inside.

Then, as the first moving body 7A, the second moving body 7B and the processing head 7C of the cutting apparatus 7 are moved, the sintered sections 20A are close-up photographed by the imaging unit 10 installed on the processing head 7C one at a time.

Next, the control apparatus (not shown) configured to control the cutting apparatus 7 calculates a center of gravity position of each of the sintered sections 20A actually formed (hereinafter, an actual center of gravity position) from an irradiation mark shown in an image captured by the imaging unit 10. If a shape of the sintered section 20A is a ring shape, as in the embodiment, the center of gravity position of each of the sintered sections 20A is to the same as a center position of each of the ring shapes.

Further, the control apparatus (not shown) configured to control the cutting apparatus 7 calculates a deviation amount between the above-mentioned actual center of gravity position and a center of gravity position of the sintered section formed when a deviation of the laser radiation position is zero i.e., when a laser is accurately radiated to the radiation target position (hereinafter, referred to as a target center of gravity position).

Then, the control apparatus (not shown) configured to control the laser radiation unit 5 corrects the laser radiation position based on the deviation amount between the actual center of gravity position and the target center of gravity position calculated by the control apparatus (not shown) configured to control the cutting apparatus 7. More specifically, as shown FIG. 8, the control apparatus (not shown) configured to control the laser radiation unit 5 corrects both elements of a translation deviation and a rotation deviation. A deviation $\Delta 1$ between an actual center of gravity position C1 and a target center of gravity position C0 is caused by any one of a translation deviation $\Delta x$ in an X direction, a translation deviation $\Delta y$ in a Y direction, and a rotation deviation $\Delta \theta$. Provided that a column vector of an arbitrary target position is $p=T(xp, yp)$ and a column vector of an actual center of gravity position corresponding to a certain target center of gravity position is $q=T(xq, yq)$, these can be represented by $p=ARq+d$—Equation (1). Further, AR is a 2-dimensional rotation matrix using $-\Delta\theta$ as a rotation angle, and d is a column vector ($d=T(\Delta x, \Delta y)$) using a translation deviation as an element. That is, the actual center of gravity position C1 can be made to substantially coincide with the target center of gravity position C0 by calculating AR and d from $\Delta 1$ and performing correction as shown in Equation (1). When this is performed on all of the sintered sections 20A, the laser radiation position is corrected in the entire region of the irradiation region R.

Figure 9:
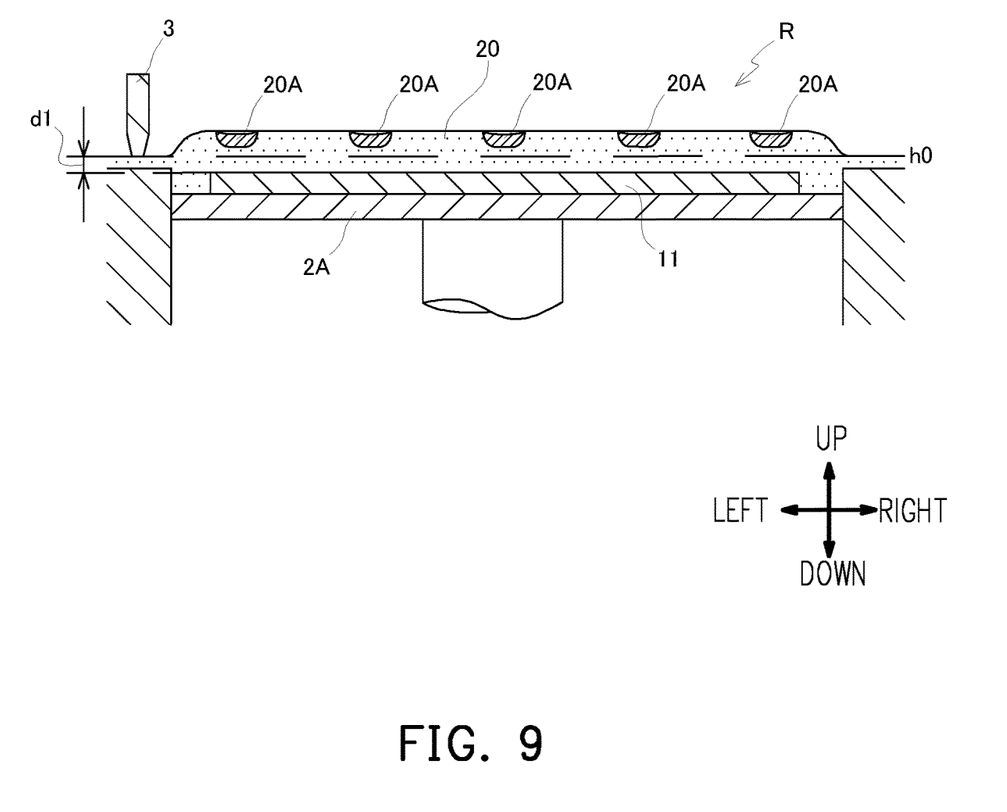
FIG. 9 is a front view of a shaping space after raising a shaping table.

Next, as shown in FIG. 9, the shaping table 2A is raised until a thickness of the powder layer 20 between the reference height h0 and the upper surface of the shaping plate 11 is a thickness d1 of the first powder layer 20B of the laminated and shaped article.

Figure 10:
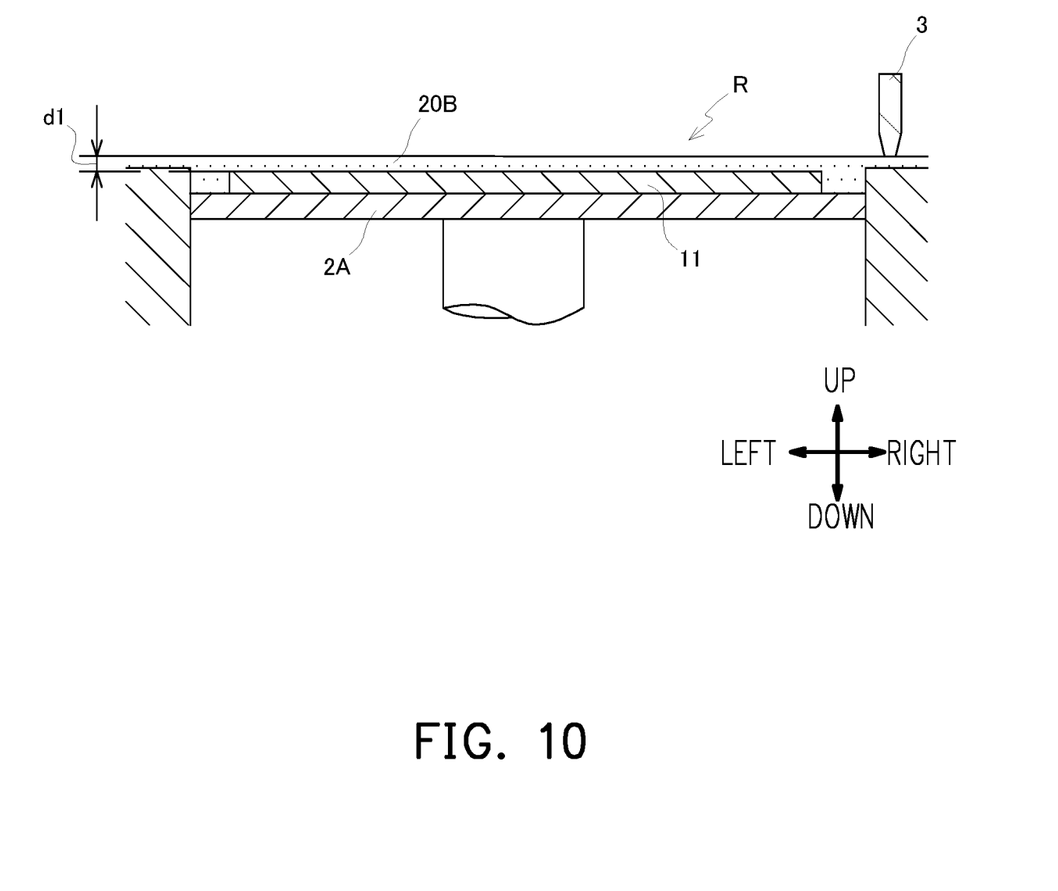
FIG. 10 is a front view of a shaping space after removing a sintered section.

Then, as shown in FIG. 10, when the recoater head 3 is moved at the reference height h0 in a horizontal uniaxial direction, the powder layer 20B having the thickness d1 corresponding to the first powder layer of the laminated and shaped article is formed, while removing an upper layer portion of the powder layer 20 including the sintered section 20A outside of the irradiation region R. After that, when laser radiation is performed on the powder layer 20B, the first sintered layer of the laminated and shaped article is formed, with shaping of the laminated and shaped article having been performed in the above-mentioned order.

(Actions/Effects)

In the embodiment, a powder material is irradiated with a laser to form the plurality of sintered sections 20A without using an irradiation target, and correction is performed by calculating a deviation between an actual center of gravity position serving as an actual laser radiation position and a target center of gravity position serving as a target laser radiation position in every sintered section 20A imaged by the imaging unit 10. Since thermal deformation occurring when the powder material is irradiated with the laser spreads radially by the laser radiation position served as a center, the center position of the sintered section 20A serving as the actual laser radiation position is not changed by thermal deformation. Accordingly, when the actual laser radiation position is calculated as a center of gravity position substantially the same as the center position of the sintered section 20A, as in the embodiment, a deviation does not occur between the actual laser radiation position and the laser radiation position after thermal deformation. In addition, since the laser radiation target is a powder material, the powder materials that form the sintered sections 20A are separated and not physically connected to each other. For this reason, heat generated when a sintered section 20A is formed by irradiating a powder material at a certain place with a laser does not influence a position of sintered sections 20A formed at places distant from this place. That is, like the case in which the laser radiation position is corrected using a heat sensitive film, a position of every irradiation mark does not change every time laser irradiation is performed. Accordingly, according to the embodiment, the actual laser radiation position also is not changed by the heat generated during formation of the sintered section 20A formed next and not changed due to the heat when any of the sintered sections 20A are formed. Accordingly, since a deviation between the actual laser radiation position and the laser radiation position calculated by the control apparatus (not shown) configured to control the cutting apparatus 7 can be prevented, in comparison with the case using the irradiation target, correction of the laser radiation position can be more accurately corrected.

In addition, since the deviation of the laser radiation position can be corrected without using an irradiation target, the burden of work of a worker such as cleaning, attachment, removal, and so on, of the shaping table to which the irradiation target is attached can be reduced. In addition, manufacturing costs can be reduced.

In addition, the sintered sections 20A are formed in the entire irradiation region R at predetermined intervals in a lattice pattern. Here, the sintered sections 20A formed at the outermost positions in the irradiation region R are formed to surround the corrected irradiation region R such that the centers of gravity position of these positions are disposed at the outermost positions in the irradiation region R. Accordingly, deviations of the laser radiation position can be corrected in the entire irradiation region R.

In addition, as the recoater head 3 is moved along the reference height h0 in the horizontal uniaxial direction after imaging of the plurality of sintered sections 20A by the imaging unit 10, at least the plurality of sintered sections 20A are removed from the irradiation region R. Accordingly, it is possible to prevent a sintered body that has been sintered a plurality of times from being included and the obtained laminated and shaped article can be homogenized. In addition, a sequence of work from correction of the deviation of the laser radiation position before the laminating and shaping to the shaping of the laminated and shaped article can be continuously and automatically performed.

In addition, the imaging unit 10 is installed on the processing head 7C. Accordingly, as the first moving body 7A, the second moving body 7B and the processing head 7C of the cutting apparatus 7 are moved, the sintered sections 20A can be close-up photographed by the imaging unit 10 installed on the processing head 7C one at a time.

In addition, the plurality of sintered sections 20A formed on the powder layer 20 by the laser radiation unit 5 have maximum widths of 0.1 mm to 5.0 mm. Accordingly, confusion between the sintered sections 20A and noise included in the image captured by the imaging unit 10 can be prevented.

Hereinabove, while the preferable embodiment of the present invention has been described, the present invention is not limited to the above-mentioned embodiment or example and various design changes may be made without departing from the spirit of the following claims.

In the embodiment, while the irradiation region R of the laser is disclosed as being substantially the same as the entire upper region of the shaping plate 11 on which the powder layer of the powder material having a predetermined thickness is formed, the irradiation region R is not limited thereto. The irradiation region R may be, for example, a part of an upper region of the shaping plate 11.

In addition, in the embodiment, while the shape of the sintered section 20A has been described as being a ring shape, the shape of the sintered section 20A is not limited thereto. The shape of the sintered section 20A may be, for example, a circular shape or a polygonal shape in which the powder material is sintered to a central portion thereof. In addition, the shape of the sintered section 20A may be, for example, a linear shape having a predetermined length, an x mark, or the like.

In addition, in the embodiment, while 25 of the sintered sections 20A have been described as being formed, the number of sintered sections 20A formed on the powder layer 20 is not limited thereto. In order to further increase the processing accuracy, 25 or more of the sintered sections 20A may be formed. In addition, if a decrease in processing accuracy were allowable, less than 25 sintered sections 20A could be formed.

In addition, in the embodiment, while the laser radiation position has been described as being corrected by correcting the center of gravity position serving as the center position of each of the sintered sections 20A, a correction point may be any point as long as the correction point is a position defined in a region of the sintered section 20A by a predetermined rule.

In addition, in the embodiment, when the laser radiation position is corrected before laminating and shaping, a laser intensity of the radiated laser and a thickness of the powder layer 20 irradiated with the laser may be appropriately changed as long as the sintered sections 20A can be formed and the sintered sections 20A remain within an area that does not reach the shaping plate 11. For example, when the laser intensity is substantially equal to that when a sintered layer of a laminated and shaped article is formed and a thickness of the formed powder layer 20 is sufficiently larger than a thickness during formation of a laminated and shaped article by one powder layer, the sintered sections 20A may be configured not to reach the shaping plate 11 while forming the sintered sections 20A on the powder layer 20. In addition, the laser intensity may be sufficiently smaller than that when a sintered layer of a laminated and shaped article is formed in the region in which the sintered sections 20A can be formed, and a thickness of the powder layer 20 may be substantially equal to a thickness of one powder layer during formation of a laminated and shaped article.

In addition, in the embodiment, while the sintered section 20A has been described as being imaged by the imaging unit 10 attached to the processing head 7C of the cutting apparatus 7, the imaging unit 10 may be attached to the recoater head 3. More specifically, the sintered sections 20A may be each close-up photographed by attaching a plurality of imaging units 10 arranged in a direction perpendicular to the moving direction on a back side of the recoater head 3 and moving these in the horizontal uniaxial direction.

In addition, in the embodiment, while the sintered section 20A has been described as being imaged by the imaging unit 10 attached to the processing head 7C of the cutting apparatus 7, an attachment object of the imaging unit 10 is not limited to the processing head 7C of the cutting apparatus 7. For example, a main shaft that is movable in 3 axial directions may be installed separately from the cutting apparatus 7 and the imaging unit 10 may be attached to the main shaft. In addition, a main shaft that is movable in 3 axial directions may be installed on a laminating and shaping apparatus in which a cutting apparatus 7 is not installed, and the imaging unit 10 may be attached to the main shaft.

Hereinabove, while the case in which the laser radiation position is corrected before starting the shaping of the laminated and shaped article has been described, the same correction may be performed during the shaping of the laminated and shaped article. More specifically, the same correction may be performed while forming the next powder layer after forming a certain sintered layer. Accordingly, since a deviation of the laser radiation position due to thermal displacement of the laser radiation unit 5 occurring in the shaping of the laminated and shaped article can be corrected, a laminated and shaped article having a higher processing accuracy can be obtained. In addition, a timing of performing correction of a deviation of the laser radiation position during shaping of the laminated and shaped article may be after every elapse of predetermined time intervals, for example, such that a predetermined number of corrections of the laser radiation positions are performed during shaping of the laminated and shaped article. Further, when the time for performing correction falls during formation of a certain sintered layer, correction of a deviation of the laser radiation position may be performed after forming that sintered layer. That is, correction of the deviation of the laser radiation position during shaping of the laminated and shaped article is performed after forming a certain sintered layer and before forming the next layer without stopping the operation in the middle of formation of a sintered layer. In addition, the same correction may be performed whenever a predetermined number of sintered layers are formed.

What is claimed is:

1. A method of correcting a laser radiation position, comprising:

forming a powder layer having a predetermined thickness on a shaping table by moving a recoater head, which flattens a metal powder material while supplying the metal powder material, in a horizontal uniaxial direction;

forming a plurality of sintered sections in which the metal powder material is sintered to surround an irradiation region which is a predetermined region of the powder layer by radiating a laser on at least a plurality of places of outermost positions in the irradiation region;

imaging the plurality of sintered sections by an imaging unit;

calculating actual laser radiation positions from center of gravity positions of the plurality of sintered sections imaged by the imaging unit respectively;

calculating a positional deviation of the laser radiation position by comparing the actual laser irradiation position with a target laser radiation position in a case where a deviation of the laser radiation position is zero in each of the sintered sections;

correcting the actual laser radiation position of each of the sintered sections to the target laser radiation position based on the positional deviation of the laser radiation position;

removing at least the plurality of sintered sections from the irradiation region as the recoater head is moved in the horizontal uniaxial direction; and forming a first sintered layer that constitutes a laminated and shaped article by irradiating the laser to the powder layer.

2. The method of correcting a laser radiation position according to claim 1, wherein the imaging unit is installed on the recoater head.

3. The method of correcting a laser radiation position according to claim 1, wherein a main shaft that is movable above the shaping section in the shaping bath is further provided, and the imaging unit is installed on the main shaft.

4. The method of correcting a laser radiation position according to claim 1, wherein the plurality of sintered sections formed on the powder layer by the laser radiation unit have a maximum width of 0.1 mm to 5.0 mm.

5. The method of correcting a laser radiation position according to claim 1, wherein the plurality of sintered sections are respectively formed by irradiating the metal material powder with the laser in a ring shape, and the center position of each of the plurality of sintered portions is served as the center of gravity position.

* * * * *